United States Patent [19]

Bright

[11] 4,220,857
[45] Sep. 2, 1980

[54] OPTICAL FLAME AND EXPLOSION DETECTION SYSTEM AND METHOD

[75] Inventor: Clark I. Bright, Walnut Creek, Calif.

[73] Assignee: Systron-Donner Corporation, Concord, Calif.

[21] Appl. No.: 956,641

[22] Filed: Nov. 1, 1978

[51] Int. Cl.$^2$ .............................................. G01J 1/00
[52] U.S. Cl. .................................... 250/339; 250/340
[58] Field of Search ............... 250/338, 339, 342, 349, 250/372; 340/578, 579

[56] References Cited

U.S. PATENT DOCUMENTS

| | | | |
|---|---|---|---|
| 3,665,440 | 5/1972 | McMenamin | 250/372 |
| 3,742,474 | 6/1973 | Muller | 340/578 |
| 3,825,754 | 7/1974 | Cinzori et al. | 250/339 |
| 3,931,521 | 1/1976 | Cinzori | 250/339 |
| 4,160,163 | 7/1979 | Nakauchi | 250/339 |

OTHER PUBLICATIONS

Linford, R. M. F. and Billow, C. F., "Optical Emission Properties of Aircraft Combustible Fluids", McDonnell Aircraft Company, technical report, AF APL-TR-7383, Aug. 1973.

*Primary Examiner*—Alfred E. Smith
*Assistant Examiner*—Janice A. Howell
*Attorney, Agent, or Firm*—Flehr, Hohbach, Test, Albritton & Herbert

[57] ABSTRACT

Optical flame and explosion detection system having first and second channels with each of the channels being responsive to different combustion products and detecting radiation from the combustion products and converting the radiation into electrical signals. A filter is provided in each of the channels to limit the spectral response to a narrow band. The levels of the radiation are ascertained by level detectors which provide first and second signals when predetermined signal levels are reached in the first and second channels. A ratio of the two electrical signals from the first and second channels is ascertained. When a predetermined level is reached from the ratio of the electrical signals and also for the individual signals, an output signal is produced which can be utilized in actuating alarms and other devices.

38 Claims, 12 Drawing Figures

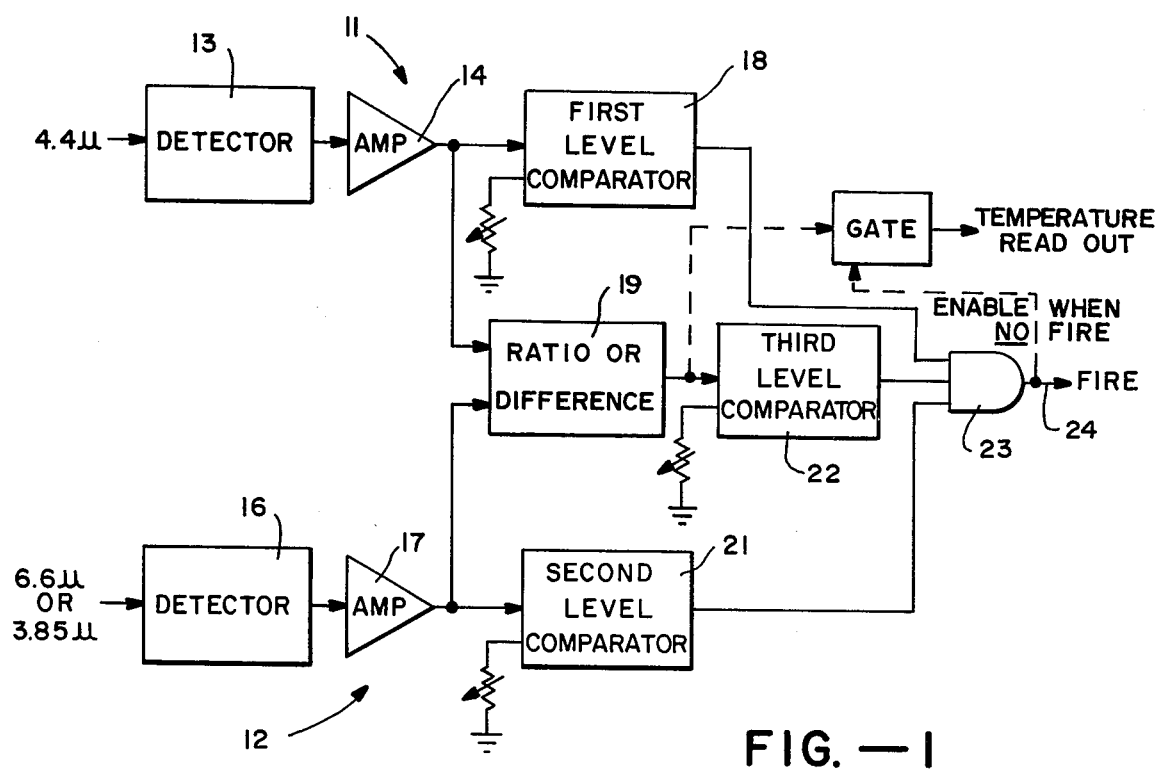
FIG. —1
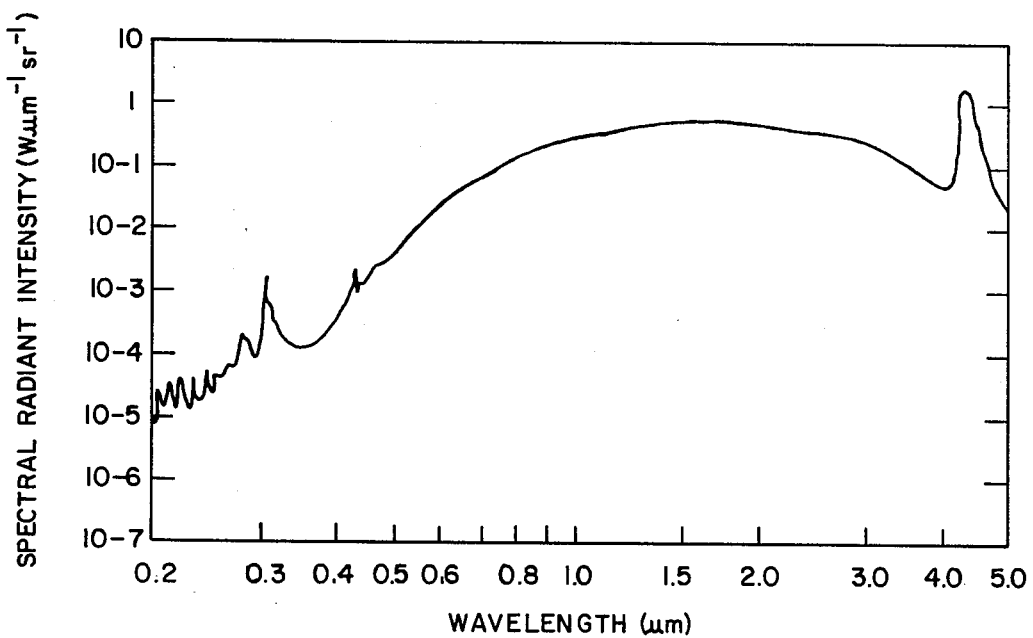
OPTICAL EMISSIONS FROM JP4 BURNING AT 35,000 FT. (190 TORR)
FIG. — 3

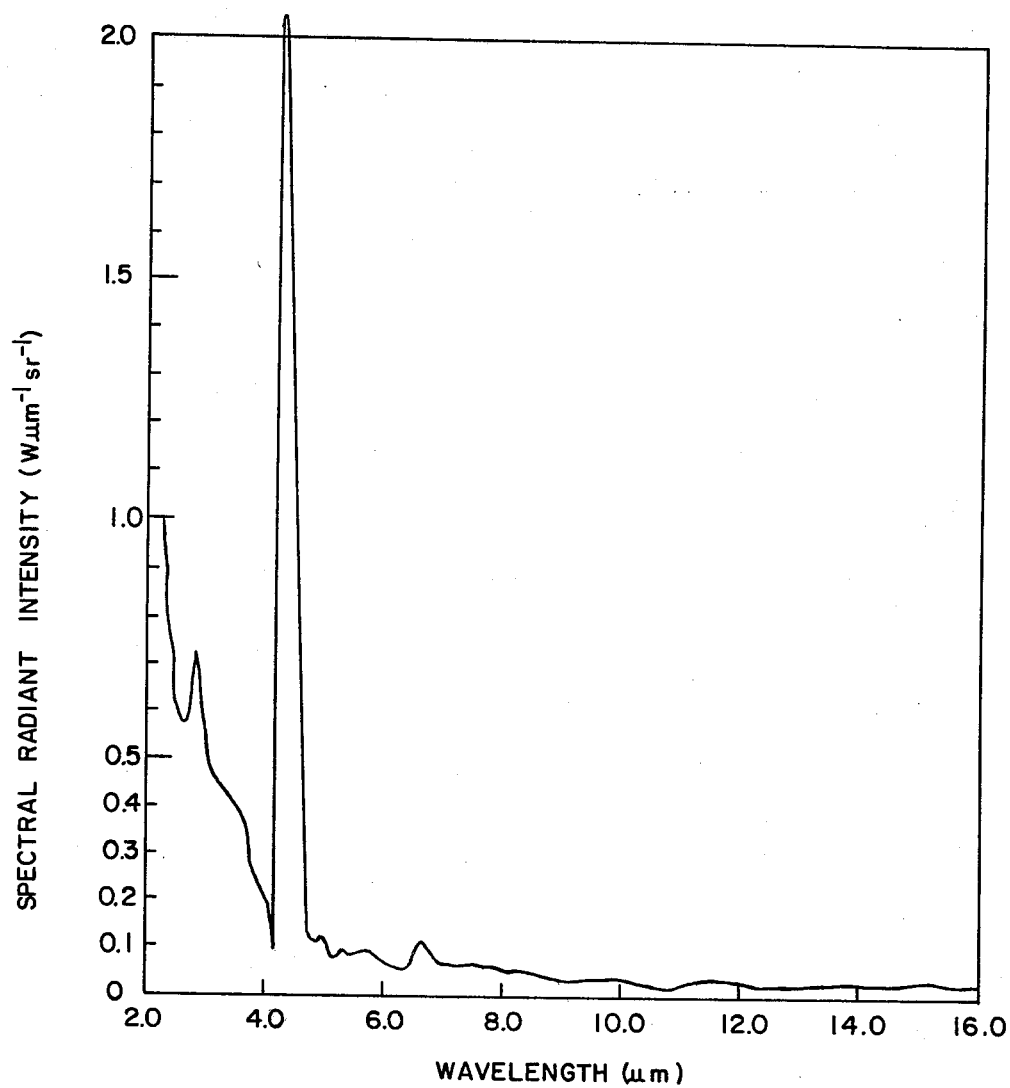
FIG.—2
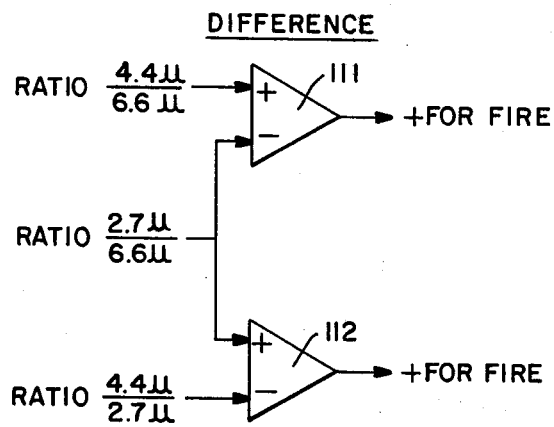
FIG.—7A
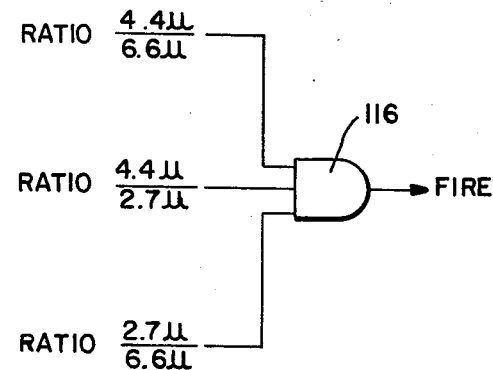
FIG.—7B

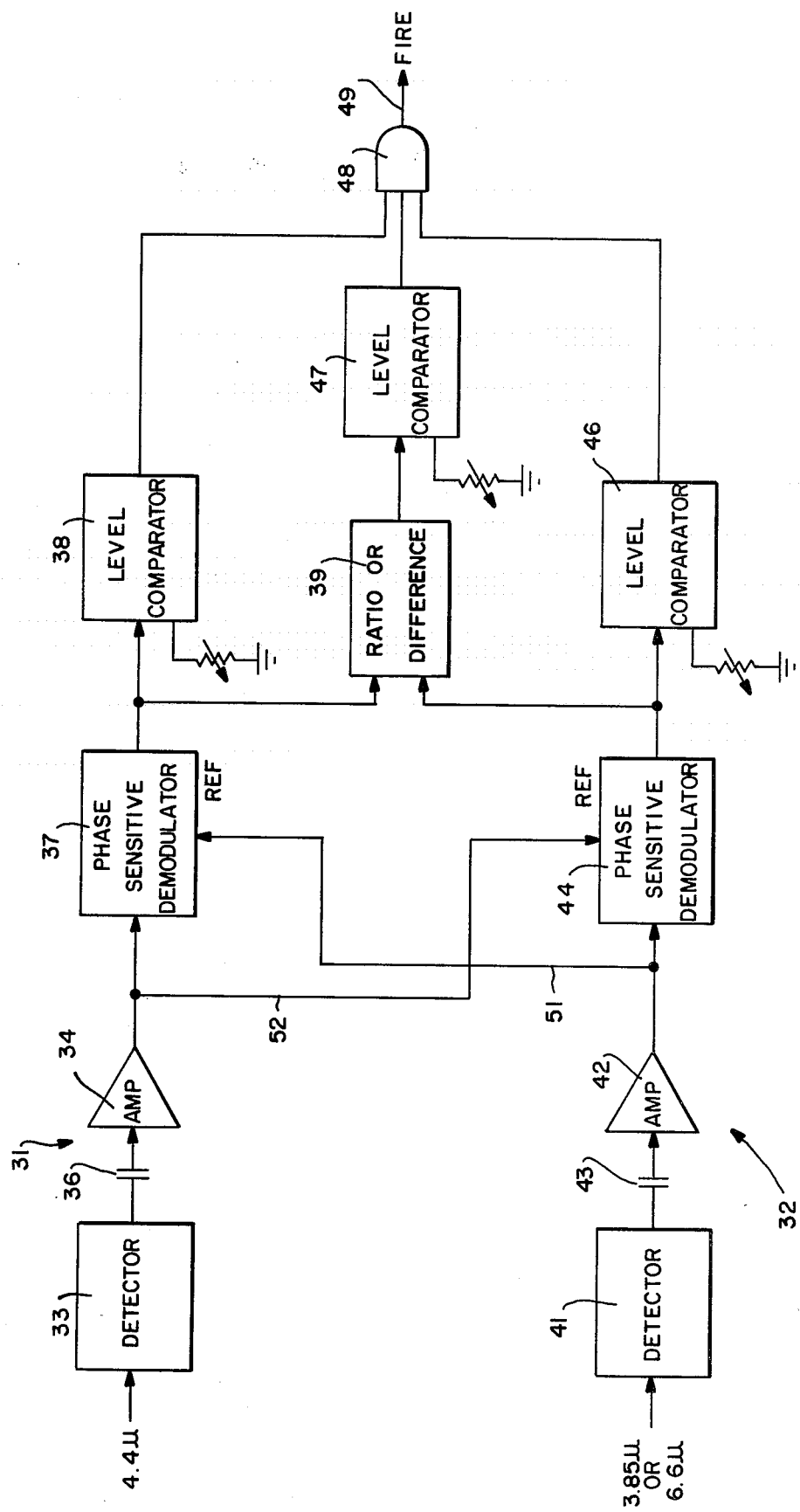
FIG.—4

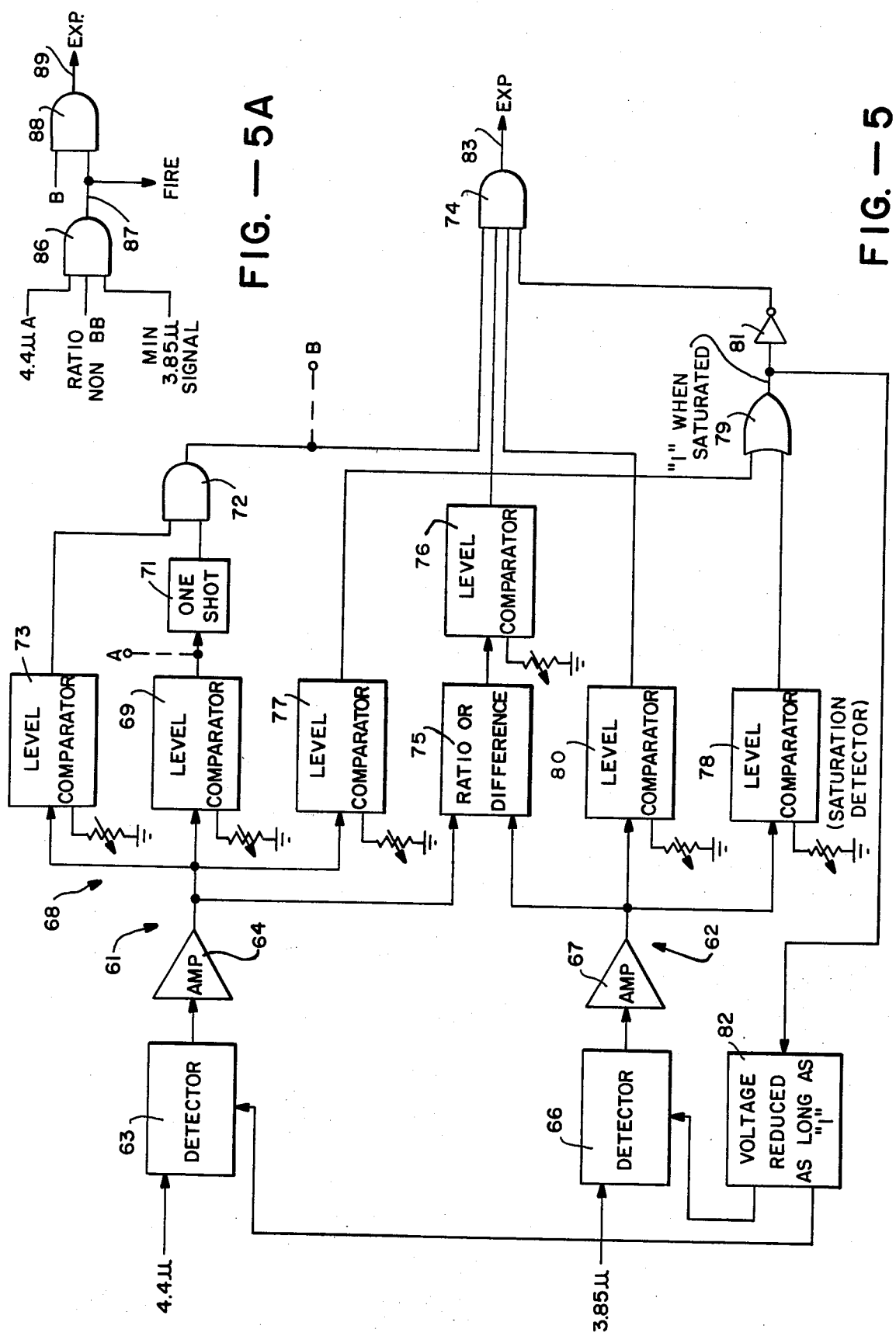

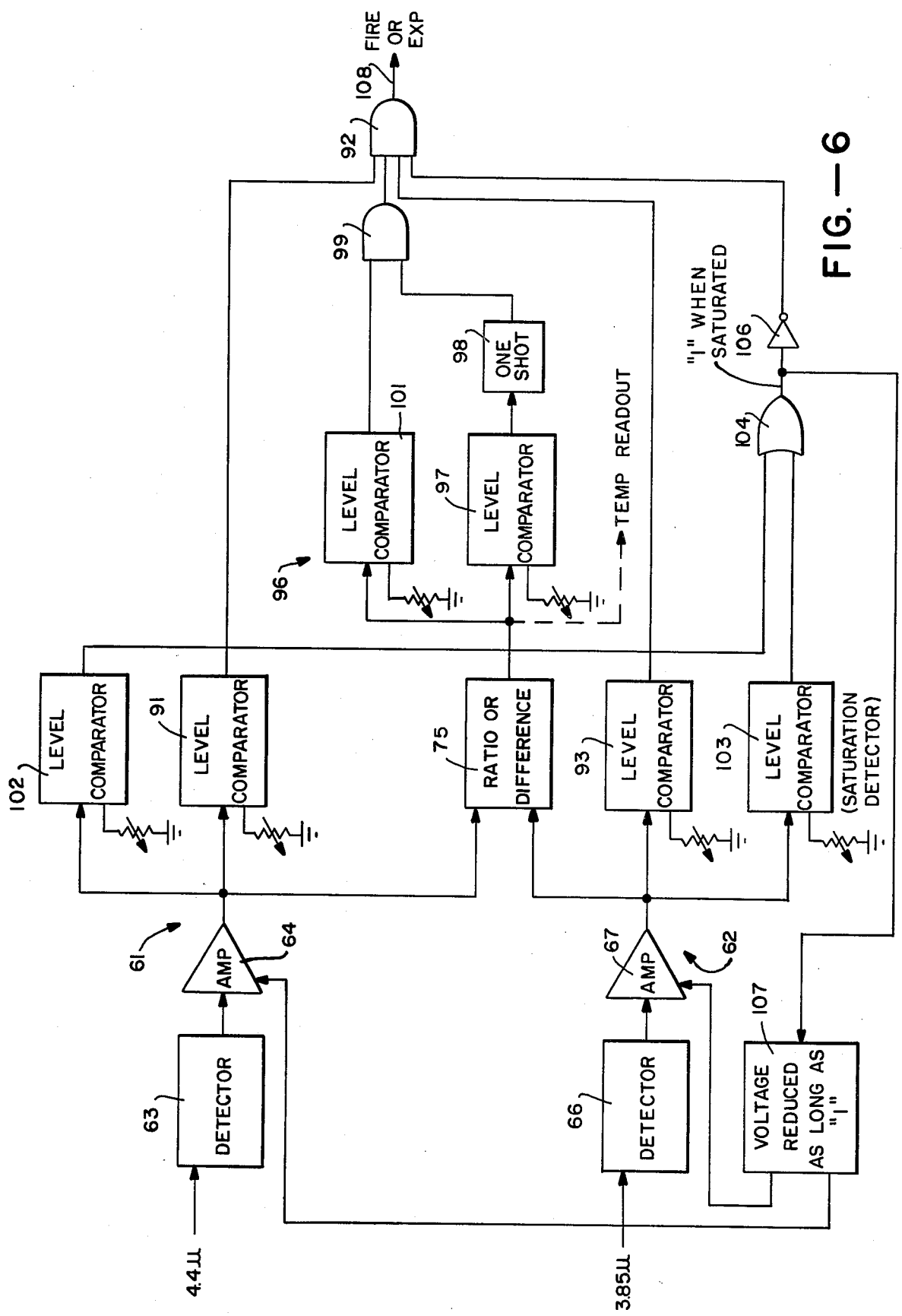
FIG.—6

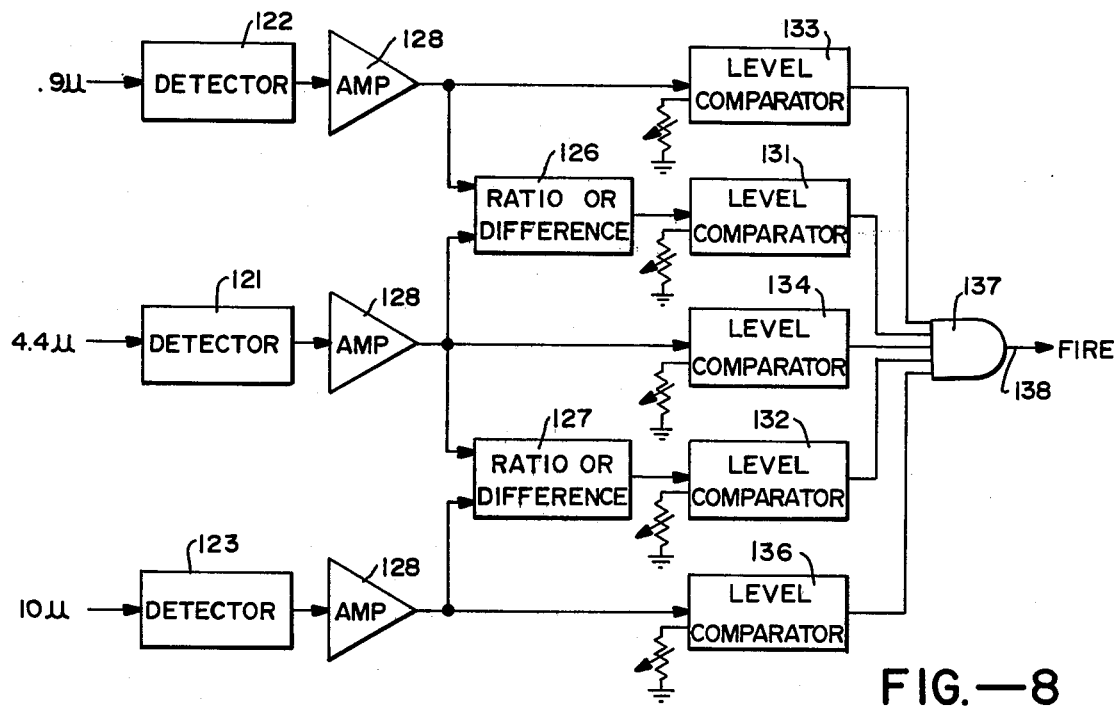
FIG.—8
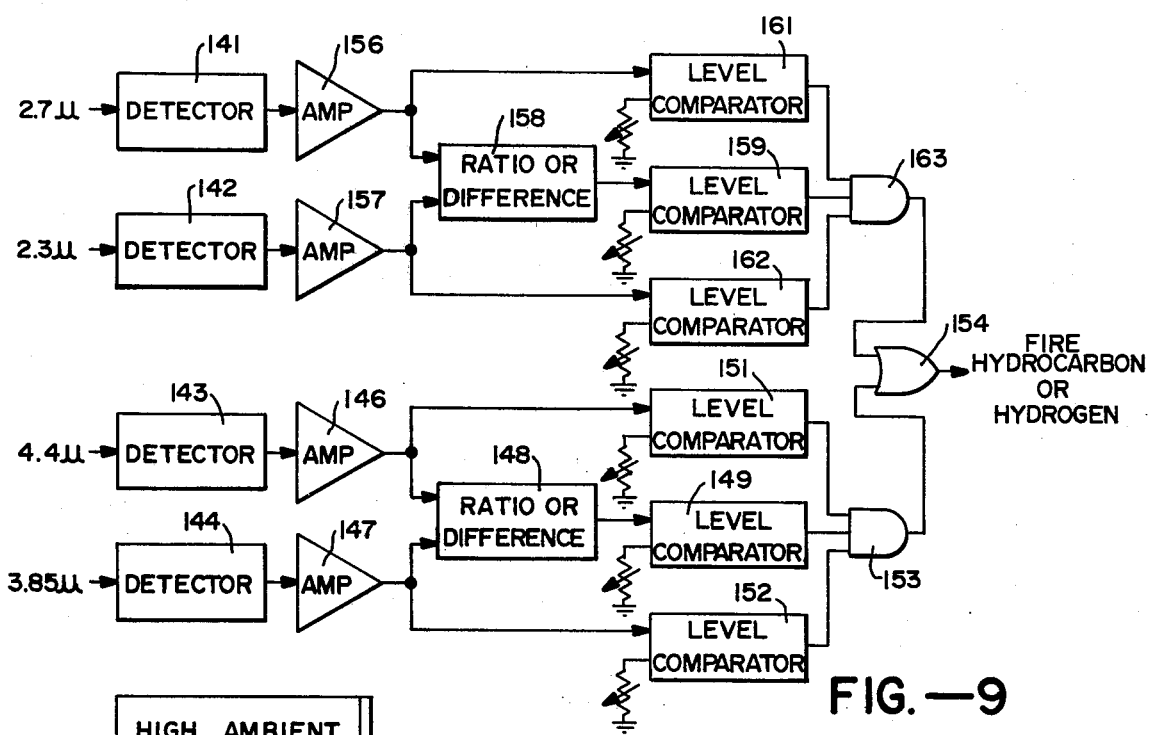
FIG.—9
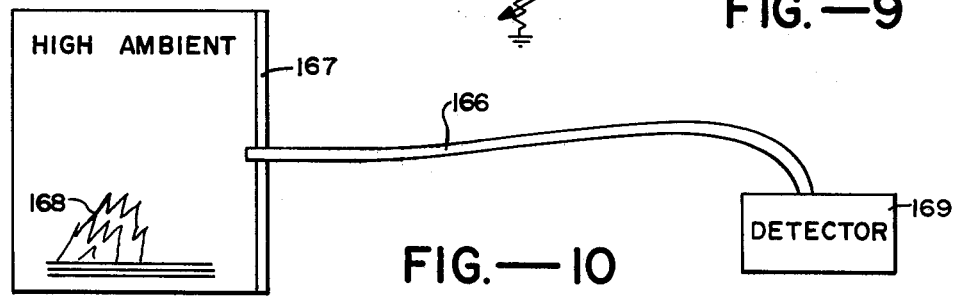
FIG.—10

OPTICAL FLAME AND EXPLOSION DETECTION SYSTEM AND METHOD

BACKGROUND OF THE INVENTION

Optical flame detection systems have heretofore been provided. For example, in Hertzberg et al, U.S. Pat. No. 3,859,520, there is disclosed a method and system for detecting spectral radiant energy as a characteristic of an explosion or a fire. Hertzberg et al utilizes an optical system to examine a spectral emission peak and attempts to define that peak by observing a wavelength associated with the peak and its adjacent sidebands. Hertzberg et al then detects the spectral irradiation incident on a plurality of optical detectors operating in the same radiant energy spectrum as the first spectral peak and compares the spectral radiation to ascertain whether an explosion or fire is taking place. Such a method may be appropriate for clean burning material such as methane which has a very sharp emission peak. However, such is not the case with respect to heavier hydrocarbons such as aircraft fuels. In the case of such fuels there is a large continuum radiation with smaller peaks on top of the overall radiation. Taking ratios such as suggested by Hertzberg et al would not be adequate to demonstrate the location of a peak. A system such as Hertzberg et al would not be suitable for adequately detecting fire with heavy hydrocarbons because the continuum background would mask the desired ratios. A report entitled "Optical Emission Properties of Aircraft Combustible Fluids" by R. M. F. Linford and C. F. Billow of the McDonnell Aircraft Company of St. Louis, Missouri 63166 was prepared for the Air Force Propulsion Laboratory, Wright-Patterson Air Force Base, Ohio 45433 under technical report AF APL-TR-7383 and carrying a date of August, 1973. This report gives the optical emission properties of aircraft combustible fluids. In utilizing the data therefrom, it would make it apparent to one skilled in the art that in a system such as disclosed in the Hertzberg et al patent would not be suitable for such heavy hydrocarbons.

Other types of systems have been attempted as, for example, dual channel infrared systems such as disclosed in U.S. Pat. No. 3,931,521. Broadband detectors are utilized and a comparison is made of the signal in both the channels to ascertain whether or not there is a fire. Such systems have a number of disadvantages including low sensitivity. Such a system can be readily fooled, e.g., truly hot surfaces will have radiation at both selected wavelengths and can be falsely detected to give a false alarm. Flicker frequency discrimination techniques have been used in several previous fire detection systems e.g. as described by Muller in U.S. Pat. No. 3,742,474. Attempts have been made to distinguish between fires as random frequency sources and truly periodic false signal source such as radiation from or modulated by a rotating member. However, flicker from a fire is neither truly random nor periodic; rather it is quasi-periodic. Over short time periods fires may flicker with distinct frequency peaks of great regularity and may even exhibit second and third harmonics. Wind tends to increase the amplitude and frequency of flickering. Over long time periods the average of a particular frequency tends to be more nearly random. Thus, techniques when depend on the fire exhibiting truly a random or periodic nature are not completely successful.

There is therefore need for a new and improved optical flame and explosion detection system and method.

SUMMARY OF THE INVENTION

The optical flame and explosion detection system consists of a first channel means responsive to radiation associated with the combustion product whereby detected radiation is converted into an electrical signal. The first channel is provided with a narrow band filter which limits the spectral response of the first channel means. The second channel means responsive to radiation associated with a combustion product which has a wavelength which differs substantially from that of the wavelength of the combustion product sensed by the first channel means whereby detected radiation in the second channel means is converted into an electrical signal. The second channel means also includes a narrow band filter which limits the spectral response of the second channel means. The first level comparator is provided for ascertaining when the electrical signal produced by the first channel means rises above a predetermined level. Second level comparator means is provided for ascertaining when the electrical signal produced by the second channel means rises above a predetermined value. Ratio or difference detector means is provided for receiving electrical signals from the first and second channel means and for producing an electrical output in accordance with a predetermined ratio or difference. Third level detector means is provided which is connected with the output of the ratio or difference detector means and provides an electrical signal when a predetermined level is reached. Gate means is provided for receiving electrical signals from the first, second and third level detectors and for producing output signals when signals are received from all three of said level detectors.

In general, it is an object of the present invention to provide an optical flame and explosion detection system and method which is not prone to false alarms.

Another object of the invention is to provide a system and method of the above character in which extremely narrow bands are utilized in at least two channels.

Another object of the invention is to provide a system and method of the above character which is more sensitive in detecting fires and explosions.

Another object of the invention is to provide a system and method which is solar blind.

Another object of the invention is to provide a system and method of the above character which will operate satisfactorily in an environment having substantial background radiation.

Additional objects and features of the invention will appear from the following description in which the preferred embodiments are set forth in detail in conjunction with the accompanying drawings.

BRIEF DESCRIPTION OF THE DRAWINGS

FIG. 1 is a block diagram of a flame and explosion detection system incorporating the present invention.

FIG. 2 is a graph showing infrared emissions from JP4 burning at sea level.

FIG. 3 is a graph showing optical emissions from JP4 burning at 35,000 feet.

FIG. 4 is a block diagram of another embodiment of an optical flame and explosion detection system incorporating the present invention which utilizes a separate method for discriminating against false signals.

FIG. 5 is a block diagram of the system shown in FIG. 1 with the addition of a rate of rise section for detecting an explosion or burn.

FIG. 5A is an alternate block diagram which can be utilized in conjunction with the block diagram shown in FIG. 5.

FIG. 6 is a block diagram similar to FIG. 4 but showing the detection system moved into position so that it follows the ratio detector.

FIG. 7A is a block diagram of an optical flame and explosion detection system incorporating another embodiment of the present invention utilizing three channels rather than two channels.

FIG. 7B is another embodiment of an optical flame and explosion detection system incorporating the present invention utilizing three channels.

FIG. 8 is a block diagram of another embodiment of an optical flame and explosion detection system incorporating the present invention utilizing three detectors and two ratio or difference detectors.

FIG. 9 is a block diagram of another embodiment of an optical flame and explosion detection system including detectors for detecting hydrogen fires as well as hydrocarbon fires.

FIG. 10 is a schematic diagram of a system incorporating the present invention for use in high temperature applications.

DESCRIPTION OF THE PREFERRED EMBODIMENTS

In FIG. 1 there is shown an optical flame and explosion detection system incorporating the present invention. As is shown therein, it consists of first and second channel means 11 and 12, each of the channel means being responsive to radiation associated with a combustion product whereby detected radiation is converted into electrical signals. The first channel is provided with an optical detector 13 which senses the desired radiation and produces an electrical output. This electrical output is amplified by an amplifier 14. The second channel means 12 is provided with a detector 16 which again converts an optical signal into an electrical signal which is supplied to an amplifier 17. Each of the detectors 13 and 16 is provided with a narrow band filter which limits the spectral response in each channel to a very narrow spectral wavelength which is associated with the molecular or continuum radiation being sensed. Thus, by way of example, the detector 13 can be utilized for sensing a product of combustion such as carbon dioxide ($CO_2$) having radiation at 4.4 microns. The narrow band filter can limit the band to 0.3 microns. The detector 16 is utilized for sensing a nearby waveband to that being sensed by the detector 13 or alternatively, it can be utilized to select a waveband quite remote from that being sensed by the first channel. Thus, the detector 16 could be chosen to select continuum radiation at 3.85 microns which is in relatively close proximity to the radiation being sensed by detector 13 or alternatively could be used to sense or detect radiation at 6.6 microns associated with water emission and which is a wavelength quite remote from the radiation being sensed by the detector 13.

The electrical output from the amplifier 14 is supplied to a level comparator 18 and also to a ratio detector 19. Similarly, the output of the amplifier 17 of the second channel means is supplied to a second level comparator 21 and also to the ratio detector 19. The output from the ratio detector 19 is supplied to a third level comparator 22. The outputs from the first, second and third level comparators are connected into an "and" gate 23 and when a signal is present from all three level comparators, an output signal is supplied on the line 24 which can be utilized to actuate an alarm or other devices. The first, second and third level comparators 18, 21 and 22 provide output signals when predetermined threshold levels are exceeded. The ratio detector 19 takes the ratio of the two signals from the amplifiers 14, 17 from the first and second channels and divides the signal level from one by the signal level from the other. This output is supplied to the third level comparator 22 and a threshold level is set in accordance with ratios calculated from FIG. 2 and from Table 1, as set forth below utilizing Planck's radiation law, and having first and second channels detecting radiation at 4.4 and 3.85 microns respectively.

Table 1

| Ratio of Blackbody Radiation at Two Wavelengths |
|---|
| $300° K. \frac{W4.4}{W3.85} = 2.4$ |
| $659° K. \frac{W4.4}{W3.85} = 1.0$ |
| $755° K. \frac{W4.4}{W3.85} = .96$ |
| $866° K. \frac{W4.4}{W3.85} = .89$ |
| $1000° K. \frac{W4.4}{W3.85} = .83$ |
| $1200° K. \frac{W4.4}{W3.85} = .77$ |
| $1500° K. \frac{W4.4}{W3.85} = .72$ |
| $1932° K. \frac{W4.4}{W3.85} = .69$ |
| $3220° K. \frac{W4.4}{W3.85} = .65$ |
| $5800° K. \frac{W4.4}{W3.85} = .61$ |

The infrared emissions from JP4, which is essentially kerosene, burning at sea level and burning at 35,000 feet is shown in FIGS. 2 and 3. Taking the data peaks from FIG. 2 the following can be seen:

(W4.4/W3.85)=8.4

By passing the same information through a narrow bandpass filter having a bandwidth of 0.3 microns, the same ratio averages to (W4.4/W3.85)=4.3

In selecting radiation to be detected by the first and second channels, it is important in connection with the present invention that at least one of the wavelengths selected correspond to a non-Planckian radiator, i.e., not a black body radiator governed by the laws developed by Planck. Therefore the ratios which were obtained with a continuum radiator and a species radiator will give ratios which are not indicative of the same ratios for a black body. Thus, the large $CO_2$ radiation at 4.4 microns can be the species radiator whereas a hot carbon background having radiation at 3.85 can be the continuum radiator.

In Table 1, the ratio of the signals obtained from a continuum radiator with constant emissivity is set forth. For example, at 300° K. the radiation for these two wavelengths has a ratio of approximately 2.4. As the body gets hotter, for example, at 755° K. the ratio is 0.96 or slightly less than 1. This trend continues with the ratio getting smaller and smaller as the body gets hotter. When the body is near a temperature which is a typical flame temperature, say 1932° K., the ratio is approximately 0.69. Even at a temperature such as the temperature of the sun at approximately 5800° K., the ratio is approximately 0.61. Thus it can be seen there is significant difference between the ratios in Table 1 which are obtained when viewing a black body and from FIG. 2 when viewing a continuum radiator and a species radiator in a fire. This substantial difference in ratios makes it possible for the present system to make error-free determinations of a fire and to discriminate between a true fire and any hot body.

The threshold level on the third comparator is set to a certain level which is always substantially greater than the level of the ratios shown in Table 1 but which is also substantially less than the normal ratio which would be encountered from a true fire. Thus, by way of example, by using the wavelengths of 4.4 and 3.85, the third threshold detector could be set so that an output signal would not be supplied unless the ratio was greater than 3. By setting the threshold for the third level detector 22 at this value, the system ascertains that the only body other than a fire that could have such a ratio is in fact much cooler than a fire and, therefore, there would be an inadequate signal for comparators 18 and 21. In other words, for a fire alarm to be given on the output 24, each channel must have an output level which is greater than the threshold level set in its associated comparator and in addition, the output from the ratio detector 19 must be greater than 3.

For a system utilizing a wavelength detector which is remote from the wavelength being detected by the other detector, for example 6.6 microns and 4.4 microns respectively, a similar analogy applies. Table 2 which is set forth below is the blackbody ratio for such a system.

Table 2

Ratio of blackbody radiation at two wavelengths $300° K. \frac{W4.4}{W6.6} = \frac{4.16 \times 10^{-4}}{2.09 \times 10^{-3}} = 0.2$ $659° K. \frac{W4.4}{W6.6} = \frac{.160}{.113} = 1.4$ $755° K. \frac{W4.4}{W6.6} = \frac{.302}{.176} = 1.7$ $866° K. \frac{W4.4}{W6.6} = \frac{.532}{.262} = 2.0$ $1,000° K. \frac{W4.4}{W6.6} = \frac{.896}{.381} = 2.4$ $1,200° K. \frac{W4.4}{W6.6} = \frac{1.59}{.580} = 2.7$ $1,500° K. \frac{W4.4}{W6.6} = \frac{2.89}{.911} = 3.2$ $1,932° K. \frac{W4.4}{W6.6} = \frac{5.12}{11.43} = 3.6$ $3,200° K. \frac{W4.4}{W6.6} = \frac{12.88}{3.060} = 4.2$ $5,800° K. \frac{W4.4}{W6.6} = \frac{29.95}{6.55} = 4.6$ From the above Table 2 it can be seen that the ratios at the different temperatures are quite different from the ratios provided in Table 1. In Table 2 the ratios progressively increase from 0.2 as the temperature increases to 4.6 for 5,800° K. In this case, using detection of this type, the threshold level for the level comparator would be set at, say, 5 to insure that no false alarms would be given. For a fire of JP4, FIG. 2, the ratio would be:

$(W4.4/W6.6) = (2.1/0.12) = 17.5$

With an adjustment for narrow bands provided by filters having 0.7 micron bandwidths, the ratio would be:

$(W4.4/W6.6) = (1.04/0.085) = 12.2$

Thus it can be seen that there is significant difference between the ratios obtained in Table 2 and the ratios obtained from a true fire in that it is readily possible to adjust the threshold for the level comparator 22 so that it will distinguish between fire and non-fire situations in the same manner as heretofore described in connection with 4.4 and 3.85 systems. By selecting a ratio of, say, 5 for the 4.4/6.6 system the only body other than a fire which could have such a ratio is hotter than the sun!

From the foregoing Tables 1 and 2 it can be seen that this system has been designed in such a manner so that the wavelengths chosen are such that when taking ratios of radiation at such wavelengths, ratios are obtained which cannot be exhibited by any hot bodies over any reasonable temperature range which could possibly be seen in practice in which there is sufficient energy for the system to detect. Thus, in accordance with the present invention it can be seen that the selection of the wavelength is important. The selection of the levels for the level comparators for each channel and the level output from the ratio detector are also important. Thus, before a fire warning is given, each of the two channels must have outputs which are greater than the level set in the level comparators and in addition the output from the ratio detector must be greater than a preset level.

From these two examples, it can be seen that in one a comparison has been made with continuum radiation at 3.85 microns. In other words, a hot carbon background has been compared with radiation of a particular molecule whereas in the other the radiation of two particular molecules has been compared.

In accordance with the present method by choosing particular wavelengths that have far more radiation than would be the case with the normal Planckian radiation at that wavelength for its temperature, one is able to obtain ratios which are much larger than can be obtained from a continuum emitter at that same wavelength. In this manner it is possible to distinguish between a source at the same temperature and a fire. In comparing the curve which is shown in FIG. 3 with that of FIG. 2, it can be seen that in FIG. 3 the peak radiation is at approximately 1.5 to 2.0 microns which corresponds roughly with a temperature on the order of 1500° K. to 2000° K. Many false signal sources, such as lights, can operate at these temperatures. It also shows that the radiation at 4.4 microns is substantially greater than it would be if one continued the trend of the continuous emission. Therefore it is clear that the ratio of that wavelength to some other wavelength would be larger than it would be for a normal continuous emitting source without $CO_2$ emission. This shows why it is important to achieve ratios which discriminate between bodies and true fires at the same temperature.

A review of Tables 1 and 2 shows that the black body ratios achieved are proportioned to the observed temperature. For a particular choice of wavelengths, say those of Table 1, a calibration between the body temperature and the unique ratio can be used to, say, provide a direct reading temperature meter. As shown in dotted lines in FIG. 1 a gate could be used to transmit the ratio signal to the meter only when no fire is present and thus the ratio would be truly indicative of temperature. This gated ratio signal could also go to a level comparator (not shown) with a predetermined threshold level representing a particular temperature. Thus, an output from this level detector would be obtained when the temperature of a hot body within the optical field of view exceeded the threshold setting indicating an overheat condition and if desired actuating a warning indicator, alarm or other device. Thus far, all the discussion has been based on taking a ratio of the two signals detected at the two wavelengths of interest. However, the unique features of these signals can also be used by taking their difference rather than their ratio. For example, if with the 4.4/6.6 system, the 6.6 signal were multiplied by a factor of, say, 5 and then subtracted from the 4.4 signal, the difference would be positive only when a fire (or sourse hotter than the sun) was present. Thus in FIG. 1, if the ratio detector 19 were replaced with a difference amplifier with its positive input from the 4.4 channel and its negative input from the 6.6 channel, and if the gain of amplifier 17 were made five times that of amplifier 14, the system would have all the characteristics of the ratio system previously described. This can be demonstrated easily by taking values from Table 2. For example at 1500° K. the 4.4 signal is 2.89 units and 5 times the 6.6 signal is 4.56 hence, their difference is −1.67 units and no fire would be indicated. A 5800° K. continuum emitter would yield a 32.75 unit signal when the 6.6 microns signal is multiplied by 5 and with a 29.95 unit signal at 4.4, the difference is −2.8 units, again not indicating a fire. However, when values for a JP4 fire given in FIG. 2 are used the 4.4 signal is 2.1 units and 5 times the 6.6 signal is 0.6, with a difference of +1.5 units indicating a fire condition.

In the previous examples $CO_2$ radiation at about 4.4 micron has been used as one wavelength for detection. Other wavelengths like 2.8 microns could also be used as the "non-planckian" emitter. Radiation in a narrow band near this wavelength is associated with both water and carbon dioxide emission. Similarly by using approximately a 0.7 micron bandwidth filter centered at 4.4 microns, radiation from $CO_2$, $CO$, and $N_2O$ can all be detected. Note that when the term "combustion product" was used, all forms of radiating species are included, e.g. molecule, free radical, particulate, intermediate, and that they may be detected in the ultraviolet, visible, near, intermediate, or far infrared as desired and appropriate.

Another feature of the system described is that the wavelength of emission from the combustion products can correspond to regions of atmospheric absorption of solar radiation. Normally, detection systems are designed to work in atmospheric "windows" because of signal loss over long path lengths. However, at moderate distances little loss is experienced and a system which is inherently "solar blind" is achieved.

In FIG. 4, there is shown another system incorporating the present invention which provides an additional means and method for discriminating against false signals in addition to those provided in FIG. 1. The system which is shown in FIG. 1 can be either a DC system or an AC system whereas in FIG. 4 an AC system is shown. The same spectral choices have been made for simplicity purposes, thus there are provided two first and second channels 31 and 32. The first channel includes the detector 33 for detecting radiation at 4.4 microns and is also provided with a narrow band filter as hereinbefore described in conjunction with FIG. 1 so that a narrow spectral band is selected. The electrical output from the detector 33 is supplied to an amplifier 34 through the coupling capacitor 36. The output from the amplifier 34 is supplied to a phase sensitive demodulator 37. The output from the phase sensitive demodulator is supplied to a level comparator 38 which is provided with an adjustable threshold. The output from the phase sensitive demodulator is also supplied to a ratio detector 39. If desired, a switching demodulator, or a multiplier or a mixer along with its attendant low pass filter can be chosen as a phase sensitive demodulator to perform the desired function.

In assembly, the channel 32 is provided with an optical detector 41 sensitive to radiation at 3.85 microns or 6.6 microns by way of example. The electrical output from the detector is supplied to an amplifier 42 through a coupling capacitor 43. The output from the amplifier 42 is supplied to a phase sensitive demodulator 44. The output from the phase sensitive demodulator 44 is also supplied to the ratio detector 39. The output from the ratio detector 39 is supplied to a third level comparator 47. The outputs from the first, second and third comparators 38, 46 and 47 respectively are supplied to an AND gate which provides a fire output signal on its output 49 when a signal is present from all three of the level comparators 38, 46 and 47. The phase sensitive demodulator 37 obtains its reference from channel 32 through a line 51 whereas the phase sensitive demodulator 44 obtains its reference from channel 31 through a line 52.

It is well known that the characteristics of most accidental fires are such that they change with time. In other words they modulate themselves so that the intensity varies with the time. This feature is capable of being utilized in connection with the embodiment of the invention shown in FIG. 4 to discriminate between a fire and a continuous non-modulated background signal. In examining fires it has been found that most of the modulation occurs in the range from 2 to 50 Hz. Thus by making the system so that it is frequency sensitive and only passes low frequencies, a discrimination capability is achieved.

In the embodiment shown in FIG. 4 phase-sensitive or synchronous detection is used in a unique way to overcome the limitations of previous systems. Phase-sensitive techniques as used, for example, in lock-in amplifiers are well known to one skilled in the art and allow extraction of signals from the noise even when the signal-to-noise ratio is less than one. However, to use phase-sensitive detection requires that the desired signal and a reference signal be of identical frequency and phase. Because the fire signal is not truly periodic a lock-in amplifier with internal reference can not be used. A mechanical chopper could be used to both modulate the fire's radiation and generate a reference signal for a phase-sensitive detector but the background radiation as well as the fire's radiation would be synchronously modulated and no discrimination would be achieved. Discrimination against background radiation is retained in FIG. 4 by sensing the self modulation of the fire and using this same modulation as the reference signal. When the radiation from the fire is random, the phase-sensitive detector acts like a normal passive rectifier in a traditional flicker frequency systems of the same band width. When the radiation is periodic the increased signal to noise ratio of a phase-sensitive detection system is achieved. Additionally, noise in either detector channel will, in general, have little effect on the system because it will be of different frequency content and out of phase with the opposite channel. Similarly, a periodic false signal in one channel will not be effective. The same periodic false signal in both channels would, of course, be synchronously demodulated. Additionally, the use of detectors to two separate wavelengths reduces the likelihood of a single modulated false signal source being detected and if two periodic signal sources are present with radiation at the correct two wavelengths, the chances of these two sources being of identical frequency and phase is remote. However, the previously described spectral discrimination techniques would prevent this signal from causing a false fire indication.

A variation of the preferred technique just described is also useful. In this variation, the same signal as the input signal to the phase sensitive demodulator is used as the reference signal for that demodulator rather than one from the opposite channel. Thus, when a quasi-periodic signal is present the advantages of phase sensitive demodulation are achieved.

Heterodyne techniques which allow use of a variable reference signal and insensitivity to harmonics or use of a second phase-sensitive demodulator circuit operating 90° out of phase with the first one for automatic phase adjustment are used in some commercially available lock-in instruments. These and other techniques can be adapted as refinements to the described method of detection but do not alter the inventive concept.

Thus it is for these reasons that the phase sensitive demodulators have been utilized. The phase sensitive demodulators in the preferred system of FIG. 4 use the signal from the opposite channel for a reference which requires that before an output can be obtained from a phase sensitive demodulator, the other channel must have received an identical frequency and phase of signal. When this signal occurs outputs would be supplied from the phase sensitive demodulators 37 and 44 to the level comparators 38 and 46 and to the ratio detector 39. The remainder of the system would therefore operate in the same manner as described in conjunction with FIG. 1. The principal difference being that both the channels 1 and 2 must receive radiation from the same source at exactly the same time and phase before an output is achieved. In other words each channel must see the same modulated radiation in frequency and phase in order to obtain a signal.

In FIG. 5 there is shown another block diagram incorporating the present invention which includes rate of rise detection for detecting an explosion or a burn through. Included in this embodiment of the invention shown in FIG. 5 is a rate of rise detection which is placed in the channel which is sensitive to the radiation from the combustion product molecule, typically $CO_2$. Again two channels 61 and 62 are provided with channel 61 having a detector 63 supplying an amplifier 64 and channel 62 having a detector 66 supplying an amplifier 67. The output from the amplifier 64 is supplied to a rate of rise section 68 which consists of a level comparator 69 that is set at a very low threshold value. When the level comparator 69 is triggered, it supplies an optical signal to a one-shot multivibrator 71 which supplies a pulse of a predetermined time length to an AND gate 72. At the same time that the signal is supplied from the amplifier 64 to the level comparator 69 it is also supplied to another level comparator 73 which is set at a higher threshold. If the signal supplied to the level comparator 73 exceeds the threshold level, the signal is also supplied to the AND gate 72. The AND gate 72 supplies a signal to the AND gate 74. Thus it can be seen that by setting the comparators 69 and 73 at different thresholds and if a signal from the amplifier 64 first sets off the level comparator 71 and within a predetermined period of time triggers the level comparator 73, this gives an indication of a particular rate of rise and supplies a signal to the AND gate 74 to make it possible to ascertain whether an explosion is taking place.

The output from the amplifier 64 for channel 61 is also supplied to a ratio detector 75. The output from the amplifier 67 for the channel 62 is also supplied to the ratio detector 75. The output from the ratio detector 75 is supplied to level comparator 76 which has its threshold adjusted in the manner hereinbefore described to give an electrical signal that is supplied to the AND gate 74. The output of the amplifier 67 is also connected to a level comparator 80 which has its output connected to the AND gate 74.

Because of the high optical signal levels which can be achieved from an explosion or from a very large or near fire, additional signal means is provided to ensure that saturation does not occur in either one or both of the channels. To this end there has been provided for each of the channels, additional level comparators 77 and 78 which have thresholds set at very high values which are the top of the maximum linear range for the amplifiers 64 and 67. The outputs of the level comparators 77 and 78 are connected to an OR gate 79 which will provide an output signal when either of the channels nears saturation and supplies an output to an inverter 81. The inverter 81 normally supplies a "non-saturated" signal to the AND gate 74. When the OR gate receives a signal from either level comparator 77 or level comparator 78 it supplies a signal to the inverter 81 which supplies the AND gate 74 so that an alarm signal can no longer be supplied by the AND gate 74 during the time that the OR gate produces a "1" on its output. The output from the OR gate 79 is supplied to a voltage reducing network 82 which has its outputs connected into the detectors 63 and 66 to reduce the bias of the same so that they operate in their linear ranges. Alternatively or additionally the outputs of 82 could reduce the gain of amplifiers 67 or 64. In addition to keeping both channels operating in their linear ranges, this circuitry is also important to ensure that the ratio between the two channels is fixed for reasons hereinbefore described.

From the system shown in FIG. 5 it can be seen that there has been provided a system making it possible to detect when an explosion is taking place by the addition of rate of rise circuitry. Whenever rate or rise circuitry produces an output, an output signal will be supplied by the AND gate 74 on its output 83. A similar second rate of rise circuit (not shown) could be included in the other detector channel is desired.

In FIG. 5A, there is shown alternate circuitry which makes it possible to give an indication of a fire and a separate signal which is an indication of an explosion. In such a case, the AND gate 74 is eliminated from FIG. 5 and a three input AND gate 86 is connected to the output from channel 61 at point A shown in dotted lines in FIG. 5. The middle line of the AND gate 86 is connected to the output from the level comparator 76 connected to the ratio detector 75. The bottom lead of AND gate 86 is connected to the second channel 62 through the output from the level comparator 80. The output from the AND gate 86 provides an output signal on its output 87 which is indicative of a fire. In addition, this output is supplied to a two-input AND gate 88 which has the output from the AND gate 72 as indicated by the letter B connected thereto which provides an output signal indicative of an explosion on its output 89. Thus, it can be seen that it is readily possible with the circuitry shown in FIG. 5A to provide indications of a fire and also of an explosion.

Another embodiment of the invention is shown in FIG. 6 which shows the rate of rise section moved to another location in the circuitry so that it is after the ratio detector rather than in one of the individual detector channels as shown in FIG. 5. Thus, there are provided two channels 61 and 62 as shown in FIG. 6 with amplifiers 64 and 67 in the respective channels. The output from the amplifier 64 is supplied to a level comparator 91 which has its output connected to an AND gate 92. The output of the amplifier 67 is supplied to a comparator 93 which has its output connected to the AND gate 92. The outputs of the amplifiers 64 and 67 are connected into the ratio detector 75. The output of the ratio detector 75 is connected into rate of rise circuitry 96 which consists of a level comparator 97 that receives the output signal from the ratio detector 75 and supplies its output to a one-shot multivibrator 98. The multivibrator 98 produces a pulse of a predetermined time length which is supplied to an AND gate 99. The predetermined time should be relatively long in comparison to the time required to explosion. The output from the ratio detector 75 is also supplied to another level comparator 101 which has a threshold which is set at a considerably higher value. Its output is also supplied to the AND gate 99. The output from the AND gate 99 is supplied to the AND gate 92.

Anti-saturation circuitry is also provided as shown in FIG. 6 and consists of level comparators 102 and 103 which are connected to the outputs of the amplifiers 64 and 66 of the two channels 61 and 62. The outputs of the level comparators 102 and 103 are supplied to an OR gate 104. The output of the OR gate is supplied to an inverter 106 and the output of the inverter 106 is supplied to the AND gate 92. The output of the OR gate 104 is supplied to voltage reducing circuitry 107 which is connected to the amplifiers 64 and 67 to reduce the gain in both the channels when a signal is received. The inverter 106 supplies a non-saturated signal to the AND gate 92 until a saturation signal is received from the OR gate 104. The junction between the OR gate 104 and the inverter 106 is saturated when a "1" is present at this junction. Thus, again it can be seen that the AND gate 92 will supply a fire and explosion signal on its output 108 when there are signals present in all four lines to the AND gate 92. It can be appreciated by utilizing the modification shown in FIG. 5a, separate fire and explosion signals can be given when desired. Similarly, phase sensitive demodulation as shown in FIG. 4 could be used with the systems of FIG. 5 or 6.

The principal advantage of the circuitry shown in FIG. 6 over that shown in FIG. 5 is that it detects a rate of rise which is a variable versus one which is constant in FIG. 5. This information can be utilized to ascertain whether or not an actual explosion has taken place. For example, if a continuum source is being chopped or modulated in some fashion with a rate of rise which would be indicative of an explosion, this would give a ratio which is a constant. That is, the ratio would be independent of the fact that the source is being modulated. If, however, there were a true explosion, the spiece radiation would, typically, grow faster than the hot carbon radiation and, therefore, the ratio would be changing. For example, one would achieve more 4.4 radiation than 3.85 in an explosion initially. It can be seen that by placing the rate of rise circuitry after the ratio detector, additional discrimination is provided to ensure that a true explosion is being observed.

From the embodiments of the invention shown in FIGS. 5 and 6, it can be seen that the explosion detecting means can be characterized as one utilizing means for detecting an explosion which utilizes a rate or rise in a signal which is greater than a predetermined rate. In FIG. 5 this rate of rise is detected in one channel whereas in FIG. 6 the rate of rise is a ratio of signals at two wavelengths. This specific type of system utilized may be dependent upon the type of explosion to be witnessed. For example, the embodiment shown in FIG. 5 would be preferable in observing a methane type of explosion whereas the circuitry shown in FIG. 6 would be preferable in observing heavier hydrocarbon type of explosion.

In certain applications, it may be desired to utilize a system and method incorporating three channels as, for example, where detecting a broader range of accidental fires. Thus, in FIG. 7A, there is shown three channels, 2.7, 4.4 and 6.6. Three different ratios are provided from these three channels to supply the same to difference detectors 111 and 112. The difference between two of the ratios must be a positive output from both 111 and 112 to give an indication of fire. Thus, it can be seen to obtain an indication of fire, another level of comparison is required with circuitry such as shown in FIG. 7 and it makes it necessary that the input from the source exceed all of the conditions provided by these three channels. It should be appreciated that for each of the inputs there would be a detector, an amplifier, and a level comparator, as well as a ratio detector and its associated level comparator and that the presence of an output from the level comparator of each channel would also be required before a fire indication is given.

In FIG. 7B there is also shown a three channel system in which three separate detectors are provided with their output filtered and amplified and supplied to level comparators and three separate ratio detectors. The outputs of these ratio detectors are supplied to level comparators and their outputs are supplied to the AND gate 116 shown in FIG. 7B which would give an indication of "fire" when an input is supplied on each of the lines to the AND gate. It should be understood that the presence of outputs from the individual channel level comparators is also required.

In FIG. 8 there is shown a block diagram of another embodiment of the present invention in which three detectors are utilized in conjunction with two ratio detectors. Thus, there has been provided a detector 121 which detects molecular radiation at 4.4 microns, two other detectors 122 and 123 which detect continuum radiation with detector 122 for 0.9 microns, a very short infrared wavelength and other detector 123 for 10 microns, a very long wavelength. This embodiment shows that the present invention is not limited to the middle infrared band nor is it limited to molecular specie detection. Only two ratio detectors 126 and 127 have been provided for the three detectors rather than three ratio detectors as in the previous embodiments. This is made possible by the choice of appropriate wavelengths.

The appropriate wavelengths are determined by calculating the ratios and determining the cases where the ratios get progressively larger and the other cases where the ratios get progressively smaller in order to ascertain the two major slopes of the temperature curve of the body. On the one side of the curve the slope is increasing and on the other side it is decreasing. By choosing the wavelengths so that one is provided on each side of the temperature curve with different slopes, it is possible to eliminate false signals because only a fire which exceeds both of the adjusted thresholds of the ratio detectors at the same level will give the proper signal.

The ratio detectors are supplied with outputs from amplifiers 128 which are connected to the detectors 121, 122 and 123. The outputs of the ratio detectors 126 and 127 are supplied to level comparators 131 and 132. The outputs from the three amplifiers 128 are supplied to level comparators 133, 134 and 136. The outputs of the level comparators 131, 132, 133, 134 and 136 are supplied to an AND gate 137 to provide a fire signal on the line 138 when the thresholds are exceeded in all five of the level detectors.

By utilizing only two ratio detectors for three detectors, it is possible to eliminate one ratio detector and therefore save the necessary electronics associated therewith.

In FIG. 9, there is shown a block diagram in still another embodiment of the present invention to provide a system which is usable for detecting hydrocarbon and hydrogen fires. This system is provided with four detectors 141, 142, 143 and 144 for detecting radiation at 2.7 microns, 2.3 microns, 4.4 microns and 3.85 microns respectively in which the 2.7 microns is associated with the water and the 4.4 microns is associated with $CO_2$. Thus, the channels which are provided with the 4.4 micron detector are typical of those previously described. The outputs are supplied from detectors 143 and 144 through amplifiers 146 and 147 which supply their outputs to a ratio detector 148. The output from the ratio detector 148 is supplied to a level comparator 149. The outputs from the amplifiers 146 and 147 are also supplied to level detectors 151 and 152. The outputs from the level detectors 149, 151 and 152 are supplied to an AND gate 153. The output from the AND gate 153 is supplied to an OR gate 154. The outputs from the detectors 141 and 142 are supplied through amplifiers 156 and 157 to a ratio detector 158. The output of the ratio detector is supplied to a level comparator 159 and the outputs of the amplifiers 156 and 157 are also supplied to level comparators 161 and 162. The outputs from level comparators 159, 161 and 162 are supplied to an AND gate 163 and the output of the AND gate 163 is supplied to the OR gate 154. The system shown in FIG. 9 by the use of an OR gate has in effect two separate channels, one for viewing hydrocarbon fires and the other for viewing hydrogen fires and will give a fire indication from the OR gate 154 when either type of fire is present.

Again it should be appreciated that, if desired, three detectors instead of four detectors can be utilized to accomplish these same two functions. This would be accomplished by choosing one of the nonPlanckian wavelengths associated with water and one being associated with $CO_2$. These can then be compared with a suitable continuum signal to provide ratios which could be utilized in the manner hereinbefore described to be utilized with the OR system as shown in FIG. 9, making possible three detectors rather than four. Thus, the 4.4 micron detector and the 2.7 micron detector could be utilized in conjunction with the single detector whose wavelength was chosen to give the desired characteristics when ratioed with the 4.4 and with the 2.7 detectors. The output from this single detector would be supplied to both channels to work in the OR system as hereinbefore described.

In FIG. 10 there is shown a system which can be utilized in high temperature applications. Such a system is utilized to overcome the present situation where no commercially available detectors can withstand very high ambient temperatures on the order of 500° to 1,000° F. In situations where detection with ambients of those temperatures is required, this can be accomplished by providing a fiber optic bundle 166 which extends through a bulkhead 167 in which a fire 168 is present. The materials for the fiber optic bundle 166 are chosen so that they can withstand the high temperatures and still transmit the spectral regions of interest. By way of example, sapphire could be utilized for the fiber optic bundle which would be capable of transmitting most of the middle infrared wavelengths. In certain shorter wavelengths quartz would be suitable. The fiber optic bundle 166 is utilized for supplying the information to a detector 169. Typically, a fiber optic bundle would be provided for each detector. However, it should be appreciated that, if desired, a single fiber optic bundle could be utilized and split at its ends with the necessary optics to provide information to all the detectors from a single fiber optic bundle.

It is apparent from the foregoing that there has been provided an optical detection system which is particularly effective for detecting fires and explosions. At least two channels are utilized and the output from the first and second channels are analyzed to ascertain whether or not it is substantially different from that given by a continuum radiation source to ascertain whether or not it is a fire and by utilizing rate of rise circuitry to ascertain whether or not it is an explosion. Suitable choice of wavelengths and filtering can be utilized to make the system so that it is solar blind. Temperature readout and sensing can be provided.

It also can be seen from the foregoing that a system method has been provided which is more sensitive in actually detecting fires and explosions. It is much less likely to false alarm and will operate satisfactorily even if there is substantial background radiation. Various changes and modification may be made, and features described in connection with one of the embodiments may, similarly, be used with the other, within the inventive concept.

What is claimed is:

1. In an optical detection system, first channel means responsive to radiation associated with a molecule, free radical or other combustion product whereby detected radiation is converted into a first electrical signal, second channel means responsive to radiation associated with a molecule, free radical or other combustion product which has a wavelength which differs from that of the wavelength of the combustion product sensed by the first channel whereby detected radiation is converted into a second electrical signal, first and second level comparators for ascertaining when the first and second electrical signals produced by the first and second channels rise above predetermined values, means for comparing the first and second electrical signals and ascertaining when they are substantially different from that given by a continuum radiation source and providing a third electrical signal and means for combining the outputs from the first and second level comparators and the third electrical signal and supplying an output signal when signals are supplied by the first and second level comparators and a signal is supplied by the means for comparing the first and second signals.

2. A system as in claim 1 wherein said first channel is responsive to radiation from a molecular or free radical emitter and wherein said second channel is responsive to continuum radiation.

3. A system as in claim 1 wherein one or more of the channels is in a wavelength region where solar energy is attenuated by absorption.

4. A system as in claim 1 wherein said first and second channels include narrow band filters for limiting the spectral response of each channel.

5. A system as in claim 1 wherein said means for comparing is in the form of a ratio detector receiving the first and second electrical signals and providing a third electrical output.

6. A system as in claim 5, together with rate of rise circuitry connected into both channels and providing outputs wherein said means for receiving includes means for reciving the signals from the rate of rise circuitry.

7. A system as in claim 5 wherein said third electrical output is used to represent temperature.

8. A system as in claim 1 wherein said means for comparing is in the form of a difference detector receiving the first and second electrical signals and providing a third electrical output.

9. A system as in claim 1 together with the rate of rise circuitry connected into one of the channels and providing an output wherein said means for combining includes means for combining a signal from the rate of rise circuitry.

10. A system as in claim 5 together with rate of rise circuitry connected to the output of the ratio detector and wherein rate of rise circuitry is connected to the means for receiving.

11. A system as in claim 5 together with rate of rise circuitry connected to the output of the difference detector and wherein rate of rise circuitry is connected to the means for receiving.

12. A system as in claim 9 wherein said rate of rise circuitry includes first and second level comparators which are receiving the same input and having low and high reference levels, a one-shot multivibrator connecting the output of the level comparator having a low reference and producing an output pulse of a predetermined time and length and means for combining the output from the one-shot multivibrator and the output of the second level comparator of the rate of rise circuitry and providing an output to the means for receiving when a signal is received from the one-shot multivibrator and the second level comparator.

13. A system as in claim 9 together with means for giving separate indications for a fire and for an explosion.

14. A system as in claim 10 together with means for giving separate indications for a fire and for an explosion.

15. A system as in claim 11 together with means for giving separate indications for a fire and for an explosion.

16. A system as in claim 1 together with means for limiting the gain of the first and second channels when predetermined levels are exceeded.

17. In a method for detecting a flame, selecting first and second wavelengths from a fire expected to be encountered one of which has far more radiation than would be encountered under normal Planckian radiation at that wavelength and temperature, detecting the radiation in those at least two wavelengths, providing first and second electrical signals corresponding thereto, combining the first and second electrical signals to ascertain whether the first and second signals as combined produce a third electrical signal which is actually different from that given by a continuum radiation source as defined by Planck's law, ascertaining when the first electrical signal exceeds a predetermined value to provide a fourth electrical signal, ascertaining when the second electrical signal exceeds a predetermined value and providing a fifth electrical signal and combining the third, fourth and fifth electrical signals to provide an output only when all three of said third, fourth and fifth signals are present.

18. In a method for detecting a flame, selecting at least three wavelengths expected to be encountered from a fire at least one of which has far more radiation than would be encountered with normal Planckian radiation at that wavelength and temperature, detecting the radiation at those at least three wavelengths, providing first electrical signals corresponding thereto, combining these signals in pairs to ascertain whether each two signals as combined produce second electrical signals which are actually different from that given by a continuum radiation source, as defined by Planck's Law, for some temperature range, ascertaining which of these second electrical signals must be further combined to produce a third electrical signal only when these second electrical signals exceed their individual predetermined values, ascertaining when the first electrical signals exceed their individual predetermined values to provide fourth electrical signals, and combining the third and fourth electrical signals to provide an output only when both of said third and fourth signals are present.

19. A method as in claim 18 but providing an output when either or both said third and fourth signals are present.

20. A method as in claim 18 together with the step of providing a fifth electrical output signal when the rate of rise of either said first or second signals exceeds a predetermined value during a predetermined period of time and combining the fifth signal with the third and fourth signals to provide an output indicative of an explosion when all these third, fourth and fifth signals are present.

21. In an optical detection system, first channel means responsive to radiation associated with a molecule, free radical or other combustion product whereby detected radiation is converted into a first electrical signal, second channel means responsive to radiation associated with a molecule, free radical or other combustion product which has a wavelength which differs from that of the wavelength of the combustion product sensed by the first channel whereby detected radiation is converted into a second electrical signal, third channel means responsive to radiation associated with a molecule, free radical or other combustion product which has a wavelength which differs from that of the wavelengths of the combustion products sensed by either the first or second channel whereby detected radiation is converted into a third electrical signal, first, second and third level comparators for ascertaining when the first, second and third electrical signals produced by the first, second and third channels rise above predetermined values, means for comparing pairs of these first, second and third electrical signals and ascertaining when a pair as combined is substantially different from that given by a continuum radiation source and providing fourth electrical signals when they exceed individual predetermined values with the outputs from the first, second and third level comparators and supplying an output signal when signals are supplied by the first, second and third level comparator and a signal is supplied by the means for comparing the fourth electrical signal.

22. A system as in claim 21 wherein said first channel is responsive to radiation from a molecular or free radical emitter and wherein said second and third channels are responsive to continuum radiation.

23. A system as in claim 21 wherein said first and second channels are responsive to radiation from a molecular or free radical emitter and wherein said third channel is responsive to continuum radiation.

24. A system as in claim 21 together with with the rate of rise circuitry connected into one of the channels and providing an output wherein said means for combining the fourth signals includes means for combining a signal from the rate of rise circuitry.

25. A system as in claim 22 together with the rate of rise circuitry connected into one of the channels and providing an output wherein said means for combining the fourth signals includes means for combining a signal from the rate of rise circuitry.

26. A system as in claim 23 together with the rate of rise circuitry connected into one of the channels and providing an output wherein said means for combining the fourth signals includes means for combining a signal from the rate of rise circuitry.

27. A system as in claim 21 wherein said first and second channels are responsive only to time varying radiation.

28. A system as in claim 27 together with means for assuring that each channel uses signals of identical frequency and phase.

29. A system as in claim 28 wherein said means is a phase sensitive demodulator.

30. A system as in claim 29 wherein said phase sensitive demodulator in each channel has a reference signal derived from another channel.

31. A system as in claim 29 wherein said phase sensitive demodulator in each channel has a reference signal derived from the same channel.

32. A system as in claim 1 wherein said first and second channels are responsive only to time varying radiation.

33. A system as in claim 32 together with means for assuring that each channel uses signals of identical frequency and phase.

34. A system as in claim 33 wherein said means is phase sensitive demodulation.

35. A system as in claim 34 wherein said phase sensitive demodulation in each channel derives the required reference signal from the other channel.

36. A system as in claim 34 wherein said phase sensitive demodulation in each channel derives the required reference signal from the same channel.

37. A system as in claim 1 together with fiber optics means for relaying the optical radiation to remote detectors.

38. A system as in claim 21 together with fiber optics means for relaying the optical radiation to remote detectors.

* * * * *